July 11, 1944.  G. E. DUNN  2,353,299
UNIVERSAL JOINT
Filed May 8, 1941

INVENTOR
George E. Dunn.
BY
Harness, Dickey & Pierce
ATTORNEYS.

Patented July 11, 1944

2,353,299

UNITED STATES PATENT OFFICE 2,353,299

UNIVERSAL JOINT

George E. Dunn, Dearborn, Mich., assignor to Universal Products Company Incorporated, Dearborn, Mich., a corporation of Delaware Application May 8, 1941, Serial No. 392,449

5 Claims. (Cl. 64—17)

The invention relates generally to universal joints, and has particular relation to a universal joint of self-aligning character.

In certain respects, the invention is related to that embodied in my copending application for patent, Serial No. 353,016, filed August 17, 1940, and to my copending application for patent, Serial No. 383,744, filed March 17, 1941, and issued as Patents 2,270,279 and 2,270,280, respectively, on January 20, 1942.

In the first mentioned copending application for patent, a universal joint is disclosed which includes a cross having trunnions and ball members turnable thereon, and a pair of yoke members having sockets for receiving the ball members. Roller bearings are employed within the balls and around the trunnions, and self-alignment of the ball members enables obtaining full roller bearing contact regardless of torque conditions. This avoids localized roller bearing engagement through initial relative movement of the trunnions and yokes circumferentially of the joint axis in the taking up of slight clearances or manufacturing tolerances and through any subsequent flexing or bending of the trunnions under torque load. Full roller bearing contact increases the torque capacity of the joint and if the rollers are subjected to localized bearing engagement, the torqued capacity is reduced.

One object of the present invention is to provide adapting means enabling application of self-aligning ball elements to universal joint yoke structures of known types.

Other objects of the invention will become apparent from the following specification, from the drawing relating thereto, and from the claims hereinafter set forth.

For a better understanding of the invention, reference may be had to the drawing wherein.

Figure 1:
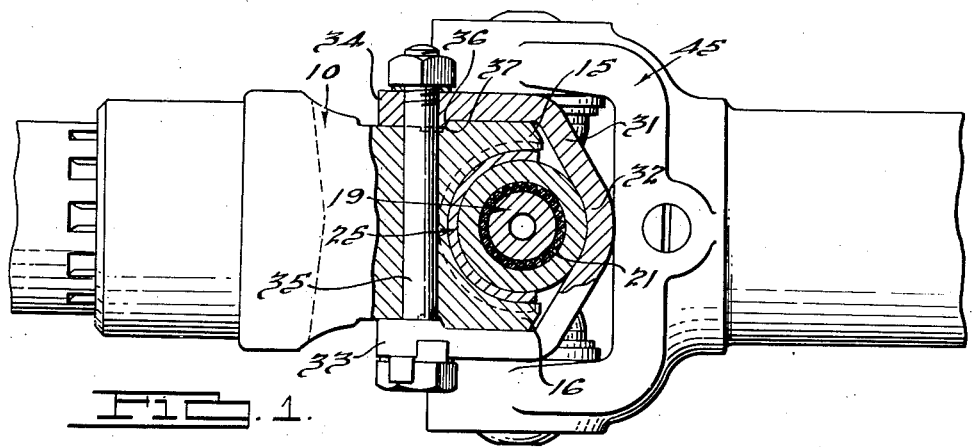
Figure 1 is a longitudinal view, partly in cross-section, of a universal joint constructed according to one form of the present invention.
Figures 4, 5, 7, 8:
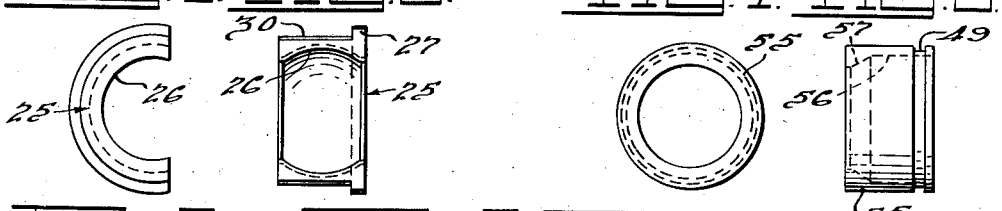
Figures 6, 9, 10:
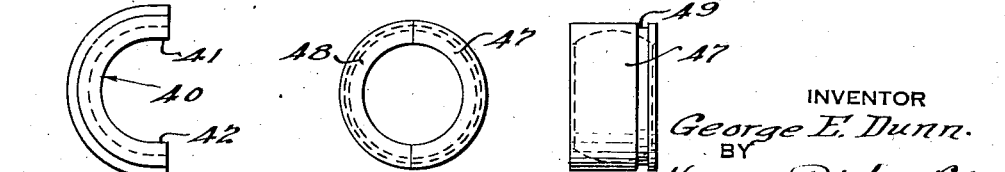

Figs. 4, 5, and 6 illustrate forms of adapter elements applicable to the yoke structure shown in cross-section in Fig. 1; and Figs. 7, 8, 9 and 10 illustrate adapter structures applicable to either of the yoke structures shown.

The universal joint illustrated corresponds generally, excepting for self-aligning features mentioned heretofore, to the universal joint shown in Wollner Patent No. 2,124,803. Briefly, the joint includes a yoke 10 having arms 11 and 12 disposed in diametrically opposed relation. Each of the arms has a semi-cylindrical recess 14 for receiving a bearing element, but it should be noted that side parts 15 and 16 of the arm project beyond the axial center line of the recess and that the inner surfaces of these parts are substantially tangential to the surfaces at the ends of the semi-cylindrical part of the recess.

The cross indicated at 18 may correspond to that disclosed in the copending application, Serial No. 383,744, previously mentioned, and it includes four trunnions, each of which is indicated at 19. Each trunnion projects into a two-part ball member 20, having small cylindrical rollers 17 and the bearing assembly thus provided may correspond to that disclosed in the mentioned copending application for patent. It may be added that the bearing assembly is sealed by means of a ferrule 21, which retains a rubber sealing ring 22 in position between the ends of the ball member and a shoulder 23 on the base of the trunnion. A wear ring, illustrated at 24, is located between the inner ends of the rollers and the shoulder 23 on the trunnion.

Figures 2, 3:
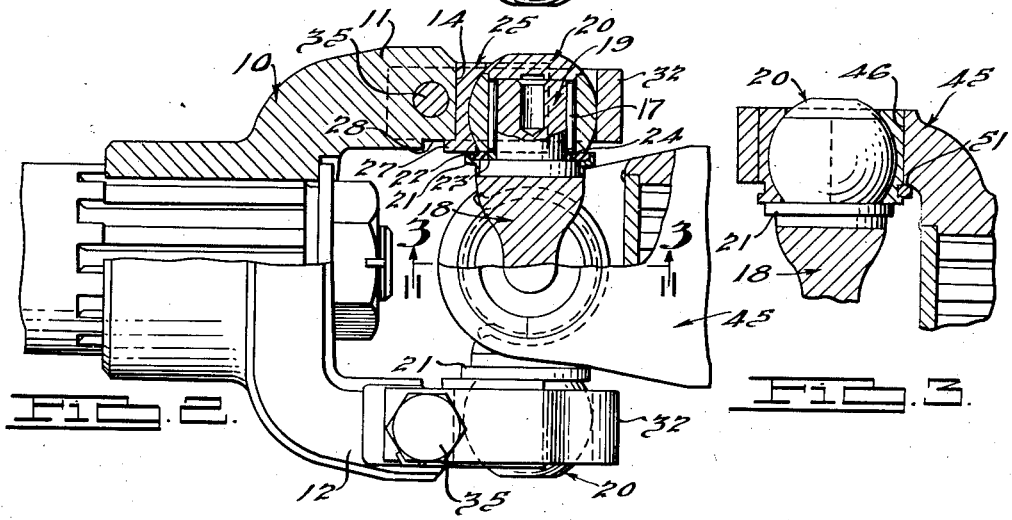
Fig. 2 is a side elevational view, partly in cross-section, of the structure shown by Fig. 1.
Fig. 3 is a cross-sectional view taken substantially along the line 3—3 of Fig. 2.

Now, for maintaining the ball members in the recesses provided in the yoke arms 11 and 12, so that the self-aligning features may be obtained, an adapter element 25 is provided for each recess and the adapter element shown in Figs. 1 and 2 corresponds to the detailed illustration in Figs. 4 and 5. This adapter element has a slightly greater than semi-spherical recess 26 for receiving the ball member 20 and assembly of the adapter with the ball is effected by slight springing of the ends of the element apart so that the ball snaps into the recess. It will be appreciated that the adapter may be constructed of suitable steel for taking care of torque loads imparted to it through the yoke arms and ball members and that it will permit the springing apart of the ends sufficiently to allow snapping of the ball member into position. At its end, toward the center of the joint, the adapter element has a shoulder 27 adapted to underlie the inner surface 28 of the yoke arm from which it follows that the adapter element is centered with respect to the joint axis and that the ball element will likewise be centered with respect to the joint axis. It may be noted that the outer surface of the adapter element is of cylindrical character, as indicated at 30, so as to fit the cylindrical recess 14.

With the ball element assembled with the adapter element, the assembly may be moved into the recess 14 until seated properly therein with the shoulder 27 engaging under the yoke arm surface 28. For holding the ball element against removal in a direction axially of the joint, a U-shaped strap 31 is provided, having a central portion 32 engaging the part of the ball and this strap has legs 33 and 34 extending along opposite sides of the yoke arm and having their rear portions connected by means of bolt fastening means 35. In order to apply pressure to the ball, so as to press it into the yoke arm recess, cam surfaces 36 and 37 are provided on the straps and yoke arms at opposite sides of the latter, so that when the bolt is tightened, the strap is drawn axially of the joint so as to apply pressure against the ball. It will be understood that this pressure is such as to firmly hold the parts assembled while still permitting the ball to adjust itself for the purposes of alignment with the trunnion and roller bearing.

An adapter construction 40 shown by Fig. 6 may be used in place of the adapter 25 and the difference between the adapters 25 and 40 is that the latter has its ends beyond the semi-spherical part directed parallel so as to provide short cylindrical extensions. In other words, the adapter 40 includes a semi-spherical part adapted to fit one-half of the ball surface and short projecting portions 41 and 42 having inner cylindrical surfaces. It might be said in this connection that a cross-section taken through either one of the projecting portions 41 and 42 would have the same appearance as a cross-section taken through the curved part of the adapter and that this cross-section would correspond to the configuration shown in Fig. 5.

Another yoke of the joint is indicated at 45, and in this case the yoke arm has cylindrical openings, indicated at 46 in Fig. 3. Each opening receives the same ball, trunnion, and roller bearing assembly previously described but the adapter element is different. The adapter element shown in Figs. 2 and 3 corresponds to that illustrated in detail in Figs. 9 and 10 and comprises two parts 47 and 48 having an annular groove 49 for receiving a snap ring adapted to engage under a shoulder 51 on the yoke arm. It will be observed in Fig. 2 that the ring is substantially greater than semi-circular in dimensions so that both parts 47 and 48 are engaged by it. The adapter is of such dimensions that when disposed around the ball and moved radially of the joint axis into the cylindrical opening 46 of the yoke arm, a sufficiently tight fit will be obtained so as to hold the adapter and ball against turning about the trunnion axis. This fit, however, is not so tight as to prevent the alignment previously mentioned.

In place of the adapter just described, an annular adapter 55 may be used as shown in Figs. 7 and 8. This adapter has a cylindrical opening 56 joining a conical bottom 57 at that end of the adapter opposite the groove 49. It may be assembled with the ball by moving it over the ball until the latter contacts the conical bottom 57. In this position the ball will have contact both with the bottom 57 and the side wall 56 and it is intended that the adapter fit the ball tightly enough to prevent turning of the ball about the trunnion axis, while still permitting the self-alignment action. Attention is directed to the fact that the conical bottom 57 acts to hold the ball in position radially of the joint axis.

While it has been mentioned that the structures shown by Figs. 4, 5, and 6 are applicable to the yoke arms 11 and 12, it may be stated that the adapters shown by Figs. 7, 8, 9, and 10 also may be used in conjunction with the yoke arms 11 and 12.

In all cases, the adapter centers the ball with respect to the joint axis and since the ball has thrust engagement with the end of the trunnion, centering of the trunnion and cross with respect to the joint axis is effected through the adapters. It is evident that the adapters may be associated with the balls without difficulty and that they may be associated with the yoke arms very easily. The constructions described and illustrated enable using adapters and self aligning ball elements in joints of general application and which heretofore have used cylindrical bushings in place of ball elements. Thus, the self-aligning features of the ball elements can be employed in generally standard types of universal joints and increase in torque capacity and other advantages and characteristics, such as mentioned in the copending applications for patent previously identified, then become characteristics of the generally standard types of universal joints which have been in use heretofore.

Although more than one form of the invention has been illustrated and described in detail, it will be apparent to those skilled in the art that various modifications may be made without departing from the spirit of the invention.

What is claimed is:

1. In a self-aligning universal joint of the four trunnion type, a bearing assembly comprising a member having an opening of cylindrical character, a trunnion projecting into the opening, a ball element in the opening and having a diametrically extending bore receiving the trunnion, and an adapter having a cylindrical exterior surface fitting the opening and having an inner surface engaging around the ball, the adapter having an open side to permit its assembly with the ball by movement transversely to the axis of the bore in the ball, the width of the open side being slightly less than the ball diameter so that the ends of the adapter must be sprung apart slightly to allow such assembly.

2. In a self-aligning universal joint of the four trunnion type, a bearing assembly comprising a member having an opening, a trunnion projecting into the opening, a ball element in the opening and having a diametrical extending bore receiving the trunnion, and an adapter having its outer surface engaging the wall of the opening in the member and having its inner surface embracing the ball, the adapter being greater than semi-annular in extent and having an open side to permit assembly with the ball by movement transversely to the axis of said bore.

3. In a self aligning universal joint of the four trunnion type, a bearing assembly comprising a member having an opening, a trunnion projecting into the opening, a ball element in the opening and having a diametrical extending bore receiving the trunnion, and an adapter having its outer surface engaging the wall of the opening in the member and having its inner surface embracing the ball, the adapter being of U shape and fitting substantially one-half of the ball with the legs of the adapter extending parallel and beyond the ball engaging surface.

4. In a self aligning universal joint of the four trunnion type, a bearing assembly comprising a member having a recess which is open longitudinally of the joint axis, a trunnion projecting radially of the joint axis and into the recess, a ball element in the opening and having a diametrically extending bore receiving the trunnion, an adapter having an external surface fitting the recess, an internal surface engaging the ball and having an open side substantially commensurate with the open side of the recess, and means connected to the member and bridging the recess for engaging the exposed surface of the ball in the open portion of the adapter for retaining the parts assembled.

5. In a self-aligning universal joint of the four-trunnion type having a pair of diametrically aligned trunnions, a pair of opposed arms having diametrically aligned openings receiving the trunnions, respectively, a ball element in each opening and having a diametrically extending bore receiving the trunnion, an adapter in the opening having an inner surface engaging the ball and an outer surface engaging the wall of the opening, each arm and its adapter having open sides, and a strap releasably fastened to each arm across the open side for retaining the ball and adapter in the opening.

GEORGE E. DUNN.